(12) United States Patent
Kobayashi et al.

(10) Patent No.: US 7,205,354 B2
(45) Date of Patent: Apr. 17, 2007

(54) RESIN-MADE MECHANICAL ELEMENT WITH EXCELLENT HEAT RESISTANCE AND DIMENSIONAL PRECISION FOR OPTICAL DISK DRIVE

(75) Inventors: Hiroyuki Kobayashi, Kanagawa (JP); Yuuji Kusumi, Kanagawa (JP); Yukihiro Bann, Tokyo (JP); Hiroto Matsuura, Kanagawa (JP)

(73) Assignee: Asahi Kasei Kabushiki Kaisha, Osaka-Shi (JP)

( * ) Notice: Subject to any disclaimer, the term of this patent is extended or adjusted under 35 U.S.C. 154(b) by 0 days.

(21) Appl. No.: 10/654,477

(22) Filed: Sep. 4, 2003

(65) Prior Publication Data

US 2005/0054763 A1    Mar. 10, 2005

(51) Int. Cl.
C08K 5/098 (2006.01)
C08K 3/34 (2006.01)
G02B 7/00 (2006.01)
C08F 283/08 (2006.01)
C08G 75/14 (2006.01)

(52) U.S. Cl. ............... 524/394; 524/449; 524/494; 524/540; 524/508; 524/609; 524/611; 359/896; 720/601; 428/324; 428/325; 428/327

(58) Field of Classification Search ............ 524/394, 524/540, 609, 611, 508
See application file for complete search history.

(56) References Cited

U.S. PATENT DOCUMENTS

| | | | | |
|---|---|---|---|---|
| 5,296,538 A | * | 3/1994 | Orikasa et al. | 525/63 |
| 5,300,552 A | * | 4/1994 | Hindi et al. | 524/494 |
| 5,304,593 A | * | 4/1994 | Nishio et al. | 524/451 |
| 5,391,611 A | * | 2/1995 | Funayama et al. | 524/508 |
| 5,409,996 A | * | 4/1995 | Shinohara et al. | 525/189 |
| 5,504,165 A | * | 4/1996 | Brown et al. | 525/390 |
| 5,824,767 A | * | 10/1998 | Gupta et al. | 528/387 |

FOREIGN PATENT DOCUMENTS

| | | | |
|---|---|---|---|
| JP | 2002249661 A | * | 9/2002 |
| JP | 2003067958 A | * | 3/2003 |
| WO | WO 200228971 A1 | * | 4/2002 |
| WO | WO 02/096991 A1 | | 12/2002 |

OTHER PUBLICATIONS

Full English-language translation of JP 2002-249661, Sep. 6, 2002.*
Machine Translation of JP 2003-067958, Mar. 7, 2003.*

* cited by examiner

*Primary Examiner*—Vasu Jagannathan
*Assistant Examiner*—Vickey Ronesi
(74) *Attorney, Agent, or Firm*—Birch, Stewart, Kolasch & Birch, LLP (57) ABSTRACT

The present invention provides: a resin-made mechanical element for optical disk drives, comprising a filler reinforced resin composition obtained by blending from 5 to 150 parts by weight of an inorganic filler in a flake form to 100 parts by weight of a resin composition comprising from 30 to 90% by weight of a polyphenylene sulfide resin, from 70 to 10% by weight of a polyphenylene ether resin and a compatibilizing agent, or a resin-made mechanical element for optical disk drives, comprising a filler reinforced resin composition obtained by blending a combination of an inorganic filler in a flake form and a fibrous reinforcing filler in a total amount of 5 to 150 parts by weight with 100 parts by weight of a resin composition comprising from 30 to 90% by weight of a polyphenylene sulfide resin, from 70 to 10% by weight of a polyphenylene ether resin and a compatibilizing agent.

26 Claims, 2 Drawing Sheets

RESIN-MADE MECHANICAL ELEMENT WITH EXCELLENT HEAT RESISTANCE AND DIMENSIONAL PRECISION FOR OPTICAL DISK DRIVE

FIELD OF THE INVENTION

The present invention relates to a resin-made mechanical element such as chassis, trays and optical pickup for use in optical disk drives such as CD-ROM, CD-R, CD-RW, DVD-ROM, DVD-R, DVD-RAM, DVD-RW, DVD+RW, MD, MO and LD (laser disk).

BACKGROUND OF THE INVENTION

Recently, in the field of mechanical element for optical disk drives such as CD-ROM, CD-R, CD-RW, DVD-ROM, DVD-R, DVD-RAM, DVD-RW, DVD+RW and MD intended to use in personal computers, audios, game players and the like, move to resinification is proceeding for the purpose of reducing the weight and cost and improving the productivity. In particular, resinification by a filler-reinforced polyphenylene ether or polycarbonate resin is actually performed in many cases mainly for optical pickup and chassis such as pickup chassis, sub-chassis and base chassis.

However, to cope with recent progress to higher performance of optical disk drives, such as reduction in thickness, the mechanical element for optical disk drives is demanded to ensure the strength, rigidity, dimensional precision and moldability while satisfying higher heat resistance and smaller thickness. Also, in the case of an optical disk drive such as CD player, DVD player and DVD navigation mounted on a car subject to a severe use environment in view of temperature, vibration or the like, resinification is not proceeding due to problems in reliability, durability and the like.

Polyphenylene ether resins or polycarbonate resins cannot satisfy those characteristics required of the mechanical element for optical disk drives particularly in view of heat resistance and mold flowability. Also, studies are being made on resinification with a super engineering plastic such as polyphenylene sulfide resin and liquid crystal polymer, however, despite excellent performance in view of heat resistance, these resins have a problem in the dimensional precision, moldability (e.g., bur), weld strength, increase in the weight, cost and the like and their application to a mechanical element for optical disk drives is difficult in many cases.

Under these circumstances, a resin composition comprising not a single resin but two or more resins is used with an attempt to solve those problems. For example, Patent Documents 1, 2 and 3 have proposed a resin composition comprising a polyphenylene sulfide resin and a polyphenylene ether resin or the like.

However, in Patent Documents 1 and 2, the compatibilizing agent for effectively mixing two different resins and the inorganic filler for improving the heat resistance, mechanical strength, dimensional precision and the like are not satisfactorily designed and various effects required of the mechanical element for optical disk drives are not satisfied. For example, in Patent Document 1, the dimensional precision decreases (the deviation of the optical axis become marked) if the ratio of resin component is large, and therefore, the resin component is specified to be from 30 to 56 vol %. This corresponds to less than 40 wt % of the resin component. In general, if the ratio of resin component is reduced, a problem is sometimes generated in the flowability to adversely affect the moldability. In Patent Document 2, glass fiber and calcium carbonate are used in combination for the purpose of satisfying both the dimensional precision and the mechanical strength, however, the content of the resin components is small also in the Examples of this patent application and the same problem as above is caused.

In Patent Document 3, the compatibilizing agent and inorganic filler are studied, but the resin composition is intended to use for secondary battery case and has a problem in that various characteristics required of the mechanical element for optical disk drives are not fully satisfied.

In this way, a thermoplastic resin capable of satisfactorily coping with the resinification of mechanical element for optical disk drives having high performance or used in a severe environment, for example, mounted in a car, is not known at present and it is keenly demanded to develop a resin-made mechanical element constituted by a resin material satisfying all of heat resistance, mechanical strength, dimensional precision, moldability, low specific gravity, mold releasability (releasability from mold) and flame retardancy.

Patent Document 1: JP-A-2001-294751 (the term "JP-A" as used herein means an "unexamined published Japanese patent application")

Patent Document 2: JP-A-2002-69298

Patent Document 3: JP-A-2002-12764

SUMMARY OF THE INVENTION

An object of the present invention is to provide a resin-made mechanical element for optical disk drives, which is excellent in all of heat resistance, mechanical strength, rigidity, dimensional precision, flame retardancy, moldability, mold releasability and lightweightness.

Other objects and effects of the invention will become more apparent from the following description.

As a result of extensive investigations to solve those problems, the present inventors found that the above-described object can be achieved when a filler reinforced resin composition obtained by using a compatibilizing agent for a resin composition comprising a polyphenylene sulfide resin and a polyphenylene ether resin and blending thereto a specific amount of an inorganic filler in a flake form such as glass flake or blending thereto a combination of an inorganic filler in a flake form such as glass flake or mica and a fibrous reinforcing filler such as glass fiber in a specific amount is used as the material. The present invention has been accomplished based on this finding.

More specifically, the present invention provides the following resin-made mechanical elements:

1. A resin-made mechanical element for optical disk drives, comprising a filler reinforced resin composition obtained by blending from 5 to 150 parts by weight of an inorganic filler in a flake form to 100 parts by weight of a resin composition comprising from 30 to 90% by weight of a polyphenylene sulfide resin, from 70 to 10% by weight of a polyphenylene ether resin, and a compatibilizing agent;

2. A resin-made mechanical element for optical disk drives, comprising a filler reinforced resin composition obtained by blending a combination of an inorganic filler in a flake form and a fibrous reinforcing filler in a total amount of 5 to 150 parts by weight with 100 parts by weight of a resin composition comprising from 30 to 90% by weight of a polyphenylene sulfide resin, from 70 to 10% by weight of a polyphenylene ether resin, and a compatibilizing agent;

3. The resin-made mechanical element for optical disk drives as described in item 1 above, wherein the inorganic filler in a flake form is glass flake;

4. The resin-made mechanical element for optical disk drives as described in item 2 above, wherein the inorganic filler in a flake form is glass flake;

5. The resin-made mechanical element for optical disk drives as described in item 2 above, wherein the inorganic filler in a flake form is mica.

6. The resin-made mechanical element for optical disk drives as described in item 2 above, wherein the inorganic filler in a flake form comprises glass flake and mica.

7. The resin-made mechanical element for optical disk drives as described in item 2 above, wherein the fibrous reinforcing filler is glass fiber.

8. The resin-made mechanical element for optical disk drives as described in any one of items 1 to 7 above, wherein the filler reinforced resin composition has a linear expansion coefficient anisotropy of from 1.0 to 2.5;

9. The resin-made mechanical element for optical disk drives as described in any one of items 1 to 7 above, wherein a combination of an amorphous α-olefin copolymer and a fatty acid metal salt is further blended in a total amount of 0.2 to 3.0 parts by weight with 100 parts by weight of the filler reinforced resin composition.

10. The resin-made mechanical element for optical disk drives as described in item 9 above, wherein the amorphous α-olefin copolymer is an ethylene-propylene copolymer and the fatty acid metal salt is magnesium stearate.

DETAILED DESCRIPTION OF THE INVENTION

The present invention is described in detail below.

In the present invention, the polyphenylene sulfide resin (hereinafter simply referred to as "PPS") which is a first component used as a resin component of the filler reinforced resin composition constituting the resin-made mechanical element for optical disk drives, is a polymer containing a repeating unit represented by the following bond unit:

in the range of 70 mol % or more, preferably 90 mol % or more, and this is a copolymer containing a repeating unit having one or more of the following structures in the range of 30 mol % or less:

The PPS for use in the present invention can be freely selected from those having a melt viscosity (shear rate: 1,000/sec) of 100 to 10,000 poises, preferably from 400 to 700 poises, at 300° C. Furthermore, the structure of PPS may be either linear or branched or may be a mixture of these structures, however, a PPS having a linear structure is preferably used.

The PPS may also be an acid-modified PPS. The acid-modified PPS as used herein is obtained by modifying the above-described PPS with an acid compound. Examples of the acid compound include unsaturated carboxylic acids such as acrylic acid, methacrylic acid, maleic acid, fumaric acid and maleic anhydride, anhydrides thereof, saturated aliphatic carboxylic acids and aromatic substituted carboxylic acids. Other examples of the acid compound include acid compounds of inorganic compound type, such as acetic acid, hydrochloric acid, sulfuric acid, phosphoric acid, silicic acid and carbonic acid.

The polyphenylene ether resin (hereinafter simply referred to as "PPE") which is a second component is a homopolymer or a copolymer containing at least one repeating unit selected from those represented by the following formula (1a) and those represented by the following formula (1b):

(1a)

(1b)

wherein $R_1$, $R_2$, $R_3$, $R_4$, $R_5$ and $R_6$ each is a monovalent residue such as an alkyl group having from 1 to 4 carbon atoms, an aryl group, a halogen and a hydrogen, provided that $R_5$ and $R_6$ are not a hydrogen at the same time.

Representative examples of the PPE homopolymer include poly(2,6-dimethyl-1,4-phenylene)ether, poly(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-chloroethyl-1,4-phenylene)ether, poly(2-methyl-6-hydroxyethyl-1,4-phenylene)ether and poly(2-methyl-6-chloroethyl-1,4-phenylene)ether.

The PPE copolymer includes polyphenylene ether copolymers mainly comprising a polyphenylene ether structure, such as a copolymer of 2,6-dimethylphenol and 2,3,6-trimethylphenol, a copolymer of 2,6-dimethylphenol and o-cresol, and a copolymer of 2,6-dimethylphenol, 2,3,6-trimethylphenol and o-cresol.

The PPE preferably has a reduced viscosity (0.5 g/dl, chloroform solution, 30° C.) of 0.15 to 2.0. Other than those described above, a polyphenylene ether resin modified with an α,β-unsaturated carboxylic acid or a derivative thereof, such as maleic acid, maleic anhydride, fumaric acid, itaconic acid, acrylic acid, acrylic acid ester, methacrylic acid and methacrylic acid ester, may also be used.

The blending ratio of the first and second components is such that the polyphenylene sulfide resin is from 30 to 90% by weight and the polyphenylene ether resin is from 70 to 10% by weight, preferably the polyphenylene sulfide resin is from 50 to 70% by weight and the polyphenylene ether resin is from 50 to 30% by weight, based on the total weight thereof. If the amount of polyphenylene sulfide resin is less than 30% by weight, the heat resistance, mold flowability and chemical resistance are insufficient, whereas if it exceeds 90% by weight, the dimensional precision is disadvantageously worsened.

As the compatibilizing agent for use in the present invention, a compound known as a compatibilizing agent for polyphenylene sulfide resin and polyphenylene ether resin, such as epoxy resin, glycidyl group-containing compound, hydrogenated block copolymer modified with a derivative of α,β-unsaturated carboxylic acid, and an oxazonyl group-containing compound, can be used. In particular, a glycidyl group-containing styrene-base resin such as styrene-glycidyl methacrylate copolymer, rubber reinforced styrene-glycidyl methacrylate copolymer and styrene-acrylonitrile-glycidyl methacrylate copolymer is preferred. The amount of the compatibilizing agent blended is preferably from 1 to 50% by weight, more preferably from 2 to 20% by weight, still more preferably from 2 to 10% by weight, per 100% by weight in total of the polyphenylene sulfide resin and the polyphenylene ether resin.

This compatibilizing agent is an essential component for obtaining the effect of the present invention and if not used, compatibility between the polyphenylene sulfide resin and the polyphenylene ether resin becomes bad and the effect of the present invention cannot be satisfactorily obtained.

The resin-made mechanical element for optical disk drives of the present invention is constituted by a filler reinforced resin composition obtained by blending an inorganic filler in a flake form to the above-described resin composition. In view of the balance among cost, moldability, mechanical strength and dimensional precision, glass flake and mica are preferably used as the inorganic filler in a flake form. Not only blending of a single inorganic filler in a flake form but also combination blending of two or more inorganic fillers in flake forms or blending in combination with a fibrous reinforcing filler such as glass fiber and carbon fiber or with other inorganic filler may be employed. In the case of using two or more inorganic fillers in flake forms in combination, a combination of glass flake and mica is preferred and the blending ratio (by mass) thereof is preferably from 10/90 to 90/10, more preferably from 25/75 to 75/25, still more preferably from 40/60 to 60/40.

The blending amount of the inorganic filler in a flake form is from 5 to 150 parts by weight, preferably from 30 to 130 parts by weight, more preferably from 40 to 100 parts by weight, per 100 parts by weight of the above-described resin components. If the amount blended is less than 5 parts by weight, the heat resistance, rigidity, strength and dimensional precision are insufficient, whereas if it exceeds 150 parts by weight, the filler cannot be uniformly dispersed in the resin and this disadvantageously causes serious decrease in the moldability or appearance.

The inorganic filler in a flake form is an essential component for obtaining the effect of the present invention and with a spherical inorganic filler represented by calcium carbonate, silica and glass bead, a sufficiently high effect cannot be obtained. However, the spherical inorganic filler may be used as an optional component on the condition that the inorganic filler in a flake form is necessary used.

In the case of blending the inorganic filler in a flake form and a fibrous reinforcing filler in combination, glass fiber is preferably used as the fibrous reinforcing filler in view of the balance among cost, moldability and mechanical property. As for the blending amount thereof, the total amount of the inorganic filler in a flake form and fibrous reinforcing filler is, similarly to the above-described blending amount of the inorganic filler in a flake form, from 5 to 150 parts by weight, preferably from 30 to 130 parts by weight, more preferably from 40 to 100 parts by weight, per 100 parts by weight of the above-described resin components. If the amount blended is less than 5 parts by weight, the heat resistance, rigidity, strength and dimensional precision are insufficient, whereas if it exceeds 150 parts by weight, the fillers cannot be uniformly dispersed in the resin and this disadvantageously causes serious decrease in the moldability or appearance. As for the blending ratio of these inorganic filler in a flake form and fibrous reinforcing filler, in view of the balance among dimensional precision, heat resistance, strength and rigidity, the inorganic filler in a flake form is preferably from 20 to 80% by weight, more preferably from 40 to 60% by weight, based on the total weight thereof being 100% by weight.

As the inorganic filler in a flake form, glass flake and mica are preferred. The glass flake in the scale form suitably has a shape such that the long diameter after the resin blending and in the molded article is 1,000 μm or less, preferably from 1 to 500 μm, and the aspect ratio (ratio of long diameter to thickness) is 5 or more, preferably 10 or more, more preferably 30 or more. If the long diameter exceeds 1,000

μm, the glass flakes are classified at the blending and cannot be uniformly mixed with the resin components and this sometimes disadvantageously causes dispersion in the physical properties of the molded article. If the aspect ratio is less than 5, the molded article is insufficient in the heat resistance, rigidity and impact resistance and this is not preferred. The glass flake available on the market may be used as it is but may also be appropriately ground before the blending in resin. For the purpose of improving the affinity for resin, the glass flake may be treated with a coupling agent of various types such as silane type and titanate type.

As for the mica in the scale form, Suzolite-Mica (trademark) can be suitably used. The mica suitably has a shape such that the long diameter after the resin blending and in the molded article is 1,000 μm or less, preferably 500 μm or less, more preferably 200 μm or less. From the standpoint of imparting rigidity, mica having a weight average aspect ratio (average diameter/average thickness of mica) of 10 or more, preferably 30 or more, more preferably 100 or more, is preferred. In particular, mica surface-treated with a coupling agent so as to improve the affinity for resin is preferably used.

The fibrous reinforcing filler which can be suitably used is glass fiber and this is a glass fiber blended in normal thermoplastic resins. Examples thereof include E glass fiber. The glass fiber preferably has a shape such that the fiber diameter is 8 to 25 μm and the average fiber length after the resin blending and in the molded article is from 20 to 1,000 μm. In particular, the glass fiber is preferably treated with a coupling agent and a binder which are conventionally known.

The linear expansion coefficient anisotropy of the filler reinforced resin composition of the present invention is preferably from 1.0 to 2.5, more preferably from 1.0 to 2.2, still more preferably from 1.0 to 2.0. For attaining excellent dimensional stability of the resin-made mechanical element for optical disk drives, it is very important to adjust the linear expansion coefficient anisotropy within the range of from 1.0 to 2.5. In view of the dimensional precision of the resin-made mechanical element for optical disk drives, the linear expansion coefficient anisotropy is preferably 2.5 or less. The linear expansion coefficient anisotropy can be adjusted by selecting the component species and compositional ratio of the resin composition. In particular, the filler component such as inorganic filler has a large effect, and when an inorganic filler in a flake form is used, the linear expansion coefficient anisotropy can be easily adjusted to the above-described preferred range.

The linear expansion coefficient anisotropy as used herein is calculated by dividing the linear expansion coefficient in perpendicular direction by the linear expansion coefficient in flow direction. The flow direction indicates a direction toward which the resin flows after the resin is ejected into a mold from a gate at the injection molding and the perpendicular direction indicates a direction perpendicular to the direction toward which the resin flows. Accordingly, in the case of a material having absolutely no linear expansion coefficient anisotropy, the value is 1.0.

Figure 3:
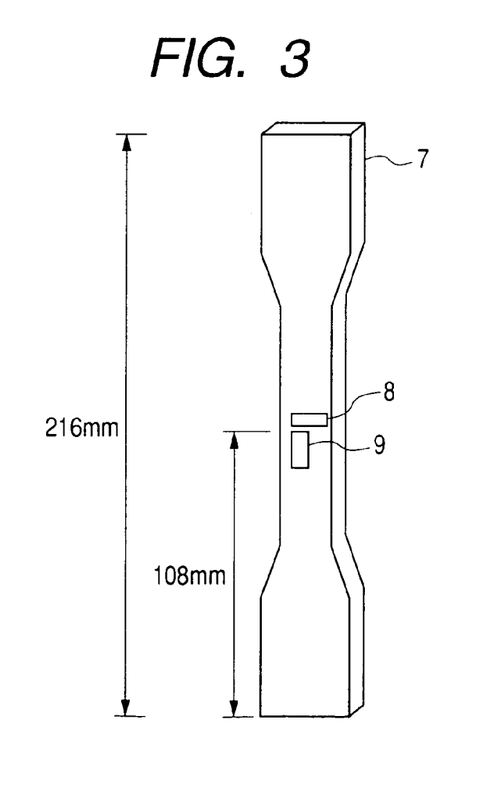
FIG. 3 is a schematic view of a dumbbell molded according to ASTM D-638 used in the present invention.
Figure 4:
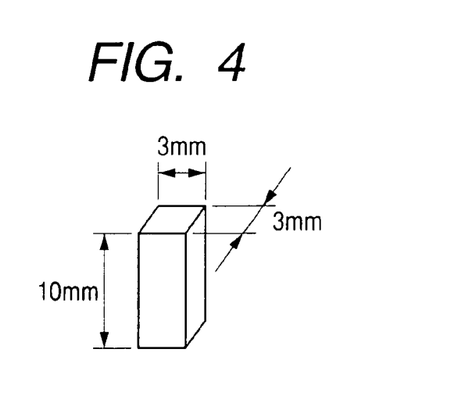
FIG. 4 is a schematic view of a specimen cut out from the dumbbell of FIG. 3.

In the present invention, the linear expansion coefficient is measured in accordance with ASTM E-831 and can be measured, for example, by the TMA method. In the present invention, a prismatic specimen (FIG. 4) having a length of 10 mm (the parallelism of both ends is ±0.025 mm) and a one-side size of 3 mm, which is cut out along each of the perpendicular direction 8 and the flow direction 9 as shown in FIG. 3 (the reference numeral 7 indicating the gate position) at the position of 108 mm from one end of a dumbbell molded according to ASTM D-638, is fixed on the body of TMA and by elevating the temperature from −35° C. to 65° C. at a rate of 5° C. per minute, the displacement amount of length is measured. From the values obtained, the linear expansion coefficient is calculated.

The polyphenylene sulfide-base resin composition often causes a problem of mold release failure at the molding due to elevation of the molding temperature and mold temperature. In the present invention, an amorphous α-olefin copolymer and a fatty acid metal salt are preferably blended in combination in a total amount of 0.2 to 3.0 parts by weight per 100 parts by weight of the filler reinforced resin composition, because the mold releasability of the polyphenylene sulfide-base resin composition is improved to eliminate the problems such as appearance failure, release failure or reduction of physical properties and a great effect of improving the releasability is brought out by the addition in a small amount.

Examples of the amorphous α-olefin copolymer which can be used in the present invention include an ethylene-propylene copolymer and an ethylene-butene copolymer. Among these, an ethylene-propylene copolymer is preferred. Examples of the fatty acid metal salt which can be used include magnesium stearate and zinc stearate. Among these, magnesium stearate is preferred.

As for the amount blended, the total amount of amorphous α-olefin copolymer and fatty acid metal salt is from 0.2 to 3.0 parts by weight, preferably from 0.3 to 2.0 parts by weight, more preferably from 0.5 to 1.1 parts by weight, per 100 parts by weight of the filler reinforced resin composition. If the total amount of amorphous α-olefin copolymer and fatty acid metal salt is less than 0.2 parts by weight, the effect of improving releasability is scarcely obtained, whereas if the total amount exceeds 3.0 parts by weight, the molded article disadvantageously suffers from molding failure (e.g., appearance failure) or reduction in the physical properties. As for the amount of each component blended, the amount of the amorphous α-olefin copolymer blended is preferably from 0.15 to 2.0 parts by weight, more preferably from 0.4 to 1.0 parts by weight. If the amount of the amorphous α-olefin copolymer blended is less than 0.15 parts by weight, the effect of improving the releasability is insufficient, whereas if the amount of the α-olefin copolymer blended exceeds 2.0 parts by weight, a failure phenomenon such as appearance failure or release failure may occur and this is not preferred. The amount of the fatty acid metal salt blended is preferably from 0.02 to 1.0 parts by weight, more preferably from 0.03 to 0.5 parts by weight. If the amount of the fatty acid metal salt blended is less than 0.02 parts by weight, the effect of improving the releasability by the blending of amorphous α-olefin copolymer and fatty acid metal salt in combination is insufficient, whereas if the amount of the fatty acid metal salt blended exceeds 1.0 part by weight, appearance failure or the like is readily generated and this is not preferred.

As for the effect by the blending of these amorphous α-olefin copolymer and fatty acid metal salt, the elastic modulus in the portion extremely close to the molded article surface decreases due to the presence of a very small amount of the incompatible soft amorphous α-olefin polymer dispersed in the portion extremely close to the surface layer of the molded article at the injection molding. As a result, the molded article is considered to readily undergo slight deformation at the interface contacting with the mold upon releasing from the mold, thereby facilitating the release of molded article. Furthermore, the fatty acid metal salt used in combination is selectively taken into the amorphous α-olefin copolymer and this is considered to provide an effect of reducing the friction between the molded article surface and the mold upon releasing from the mold.

In the resin composition of the present invention, an amorphous α-olefin copolymer and a fatty acid metal salt are blended in combination and by virtue of the synergistic effect of the slight deformation in the portion very close to the molded article surface contacting with the mold and the reduction of friction between the mold and the molded article upon releasing from the mold, the releasability is remarkably improved.

In the resin composition constituting the resin-made mechanical element for optical disk drives of the present invention, in addition to the above-described components, a polystyrene-base resin (e.g., polystyrene, styrene-acrylonitrile copolymer and rubber-modified polystyrene (HIPS)), and/or a thermoplastic elastomer (e.g., polybutadiene, polyisoprene, styrene-butadiene copolymer, butadiene-isoprene copolymer, hydrogenated styrene-butadiene block copolymer and hydrogenated styrene-isoprene block copolymer) may also be blended. Among these, for the purpose of improving fluidity or impact resistance, polystyrene, rubber-modified polystyrene, hydrogenated-butadiene copolymer and hydrogenated styrene-isoprene are preferred. The blending amount thereof is preferably 30 parts by weight or less, more preferably from 3 to 20 parts by weight, per 100 parts by weight of the total amount of resin components, that is, polyphenylene sulfide resin, polyphenylene ether resin and compatibilizing agent. If desired, additives used for normal thermoplastic resins may be further added, such as heat stabilizer, ultraviolet absorbent, flame retardant, mold releasing agent, lubricant, dye and pigment.

The filler reinforced resin composition is prepared by using a conventionally known technique such as Brabender, kneader, banbury mixer and extruder. In particular, extruder is preferred.

The resin-made mechanical element for optical disk drives of the present invention can be obtained by molding the above-described filler reinforced resin composition according to a general injection molding method or a known molding method such as injection press molding or gas injection molding.

The mechanical element for optical disk drives as referred to in the present invention is a mechanical element used in devices of optically or magnetically performing writing or reading using, as a recording medium, a disk such as CD-ROM, CD-R, CD-RW, DVD-ROM, DVD-R, DVD-RAM, DVD-RW, DVD+RW, DVD-video, MD, MO and LD, for example, in computers, game players, sound players, video players and AV devices. This mechanical element collectively includes resin-made mechanical elements such as chassis (e.g., optical pickup base, pickup chassis, traverse base, sub-chassis, base chassis), trays (e.g., disk tray, changer tray) and accessories (e.g., disk guide, frame). In particular, the resin-made mechanical element of the present invention exerts a great effect when used as a mechanical element for optical disc drives, such as chassis, tray and optical pickup base intended to use in CD player, DVD video, DVD navigation, MD player or the like mounted in a car subject to a severe use environment in view of temperature or the like, or as a mechanical element for thin-type optical disk drives.

Figure 1A:
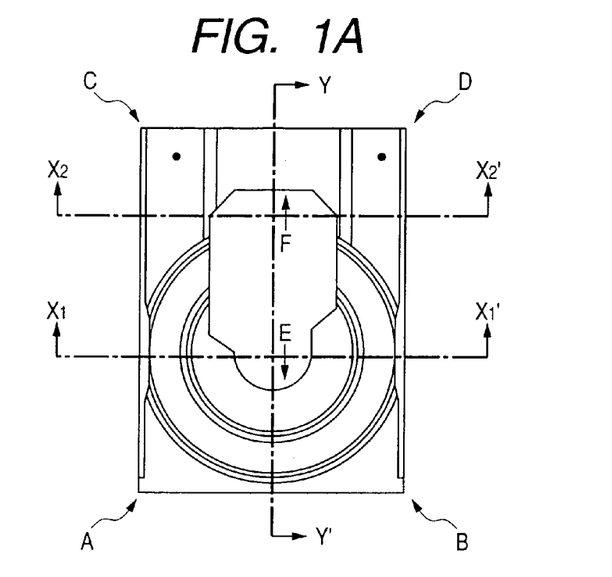
FIG. 1 are a view showing the shape of a tray used for the evaluation of the optical disk drive mechanical element of the present invention.
Figure 1B:
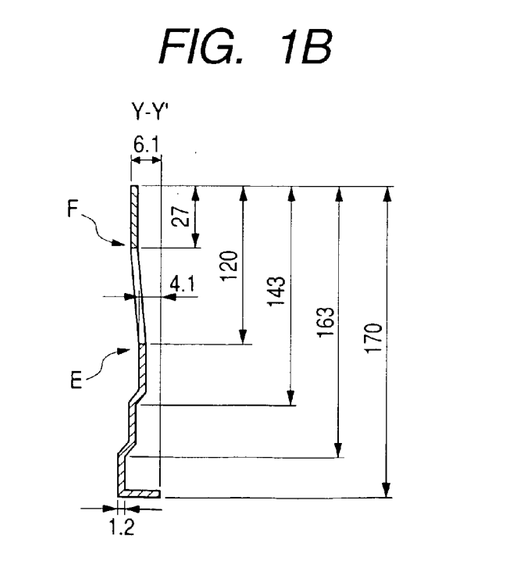
Figure 1C:
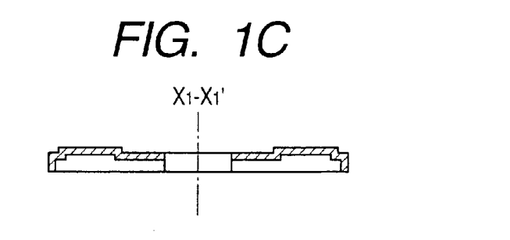
Figure 1D:
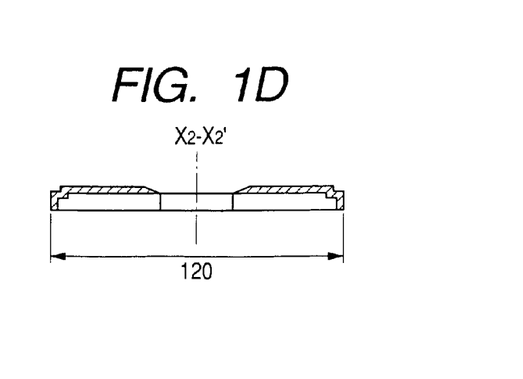
Figure 2:
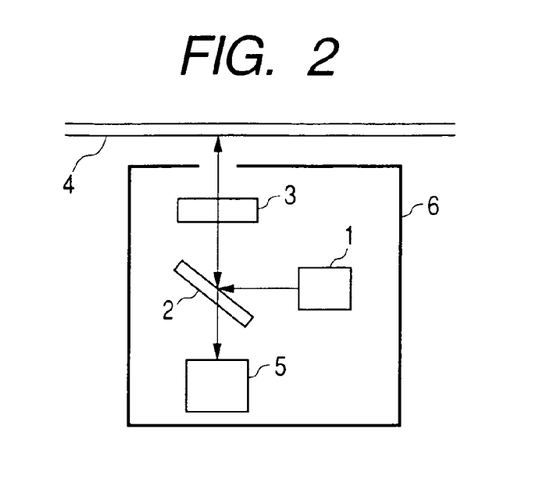
FIG. 2 is a schematic view showing one example of the optical pickup device for use in the present invention.

FIG. 2 shows one example of the optical pickup device. In the optical pickup device of FIG. 2, laser beams are output from a semiconductor laser 1 as a light source, reflected by a beam splitter 2 (which reflects light from a semiconductor laser and transmits light from an optical disk recording surface) and focused on an optical recording surface 4 through a lens 3 and the reflected light from this recording surface is made incident on a photodiode 5 as a light-receiving part through the lens 3 and the beam splitter 2 to obtain data signals. When the data signal is an error signal, the focus and tracking are controlled by moving the lens 3 from side to side and up and down. These elements constituting the optical pickup device are usually held within an optical pickup base 6. When the present invention is used as the optical pickup base, a great effect is provided on the dimensional precision (particularly warping) or moldability (particularly amount of flash).

EXAMPLES

The present invention will be illustrated in detail with reference to the following Examples and Comparative Examples, but the invention should not be construed as being limited thereto.

The following components were used in the Examples and Comparative Examples.

1) Polyphenylene Sulfide Resin:

A polyphenylene sulfide resin having a linear structure and having a melt viscosity (a value measured by a flow tester after holding the resin at 300° C., a load of 20 kgf/cm$^2$ and L/D=10/1 for 6 minutes) of 500 poises.

2) Polyphenylene Ether Resin:

A poly-2,6-dimethyl-1,4-phenylene ether (density: 1.06 g/cm$^3$) having a limiting viscosity [η] of 0.52 (at 30° C. in chloroform).

3) Compatibilizing Agent:

A styrene-glycidyl methacrylate copolymer (weight average molecular weight: 110,000) containing 5% by weight of glycidyl methacrylate.

4) Hydrogenated Styrene-Butadiene Block Copolymer:

The bonded styrene amount is 35% by weight (number average molecular weight: 178,000).

5) Inorganic Filler in a Flake Form: Glass Flake

Microglass Fleka REFG-302 (produced by Nippon Sheet Glass Co., Ltd.).

6) Inorganic Filler in a Flake Form: Mica

Suzolite•mica 200KI (produced by Kuraray Co., Ltd.)

7) Fibrous Reinforced Filler: Glass Fiber

RES03-TP015 (produced by Nippon Sheet Glass Co., Ltd.).

8) Ethylene-Propylene Copolymer:

Tafmer PO$_{680}$ produced by Mitsui Chemicals, Inc.

9) Magnesium Stearate:

Produced by Dainichi Kagaku Kogyo K.K.

The evaluation method of physical properties, the evaluation method of optical disk drive mechanical element (tray shape of FIG. 1) and the criteria for evaluation are as follows.

(1) Evaluation of Physical Properties of Material

1) Specific Gravity:

Measured according to ASTM D-792

2) Flexural Modulus:

Measured according to ASTM D-790; 23° C. or 80° C.

3) Heat Deflection Temperature:

Measured according to ASTM D-648; load: 1.82 MPa.

4) Mold Shrinkage Percentage:

Measured according to ASTM D-955: specimen: a plate of 150×150×2 mm.

5) Linear Expansion Coefficient:

Measured according to ASTM D-696; measurement temperature range: from −30 to 65° C.

6) Anisotropy:

In the mold shrinkage percentage and linear expansion coefficient, the ratio of direction perpendicular to flow/flow direction was calculated; as the value of anisotropy is smaller, the dimensional precision such as warping is better.

7) Flame Retardancy:

Measured according to UL94; thickness of specimen: 1.6 mm.

8) Mold Releasability:

A cup-shape molded article having an outer diameter of 50 mm, a height of 50 mm and a wall thickness of 3 mm was injection molded and the load necessary for sticking out the molded article was measured as the mold-releasing force.

9) Surface Stripping:

The molded article was judged with an eye.

(2) Evaluation of Dimensional Precision of Optical Disk Drive Mechanical Element The tray molded article for optical disk drives shown in FIG. 1 was evaluated on the warping with an eye and measured on the amount of warping from the reference plane by using a thickness gage. As the numerical value is smaller, the dimensional precision is higher. Measurement points: A to F (shown in FIG. 1) Criteria for visual evaluation on warping of molded article:

A: Warping was not observed.
B: Warping was slightly observed.
C: Warping was clearly observed.

Condition 1):

After molding, the molded article was left standing at 23° C. for 48 hours.

Condition 2):

The molded article was left standing at a high temperature and then left standing in an oven at 120° C. for 48 hours.

The warping and flash in Table 4 were measured by the following methods.

Warping of molded article: The positions in the X, Y and Z axis directions were measured at an arbitrary specified point of the optical pickup base by using a three-dimensional measuring apparatus (AE122, manufactured by Mitutoyo Corporation) and the difference between the minimum position and the maximum position per unit length was calculated. As the value is larger, the warping is larger.

Amount of flash: The amount of flash at an arbitrary position of the molded optical pickup base was observed by a stereomicroscope and the maximum length was measured.

Examples 1 to 10 and Comparative Examples 1 to 7

Respective components of the composition shown in Table 1, that is, a polyphenylene sulfide resin, a polyphenylene ether resin, a compatibilizing agent, an inorganic filler in a flake form and a fibrous reinforcing filler, were melt-kneaded in a twin-screw extruder (ZSK-40, manufactured by WERNER & PFLEIDERE) set at a temperature of 290 to 320° C. and a screw rotation number of 500 rpm to obtain a composition pellet. Using this pellet, a test piece for evaluation of physical properties of material and a tray molded article for optical disk drives were injection molded at a cylinder temperature of 290 to 310° C. and a mold temperature of 90° C. and then subjected to various tests by the methods described above. The evaluation results are shown in Table 2.

In Comparative Example 1 where an inorganic filler in a flake form was not added and in Comparative Example 4 where the amount of a polyphenylene sulfide resin blended was increased, the molded article was largely warped. In Comparative Example 2 where the blended amount of an inorganic filler in a flake form is small, the rigidity was insufficient and good results were not obtained. In Comparative Example 3 where the blended amount of an inorganic filler in a flake form was increased and in Comparative Example 5 where the amount of a polyphenylene ether resin blended was increased, the flowability of resin was extremely bad and a good molded article could not be obtained. In Comparative Examples 6 and 7 where a compatibilizing agent was not added, satisfactory results were not obtained in both the physical properties and the dimensional precision.

Comparative Example 8

Using a polyphenylene sulfide resin (Idemitsu PPS C-1040SG, produced by Idemitsu Petrochemical Co., Ltd., blended material with 40% of glass fiber), a test piece and a tray molded article for optical disk drives were prepared in the same manner as in Example 1 (except that the cylinder temperature was from 300 to 330° C.) and subjected to various tests by the methods described above. The evaluation results are shown in Table 2.

TABLE 1

| | | Examples | | | | | | | | | | Comparative Examples | | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 1 | 2 | 3 | 4 | 5 | 6 | 7 |
| Resin Blended Composition (wt %) | Polyphenylene sulfide resin | 35 | 35 | 35 | 35 | 49 | 44 | 35 | 35 | 35 | 24 | 35 | 63 | 21 | 53 | 12 | 36 | 36 |
| | Polyphenylene ether resin | 23 | 23 | 23 | 22 | 17 | 31 | 12 | 19 | 23 | 14 | 23 | 28 | 12 | 5 | 46 | 24 | 24 |
| | Compatibilizing agent | 2 | 2 | 2 | 3 | 4 | 5 | 3 | 2 | 2 | 2 | 2 | 5 | 2 | 2 | 2 | | |
| | Hydrogenated styrene-butadiene block copolymer | | | | | | | | 4 | | | | | | | | | |
| | Glass flake | 40 | 20 | | 10 | 30 | 10 | 50 | 40 | 20 | | 4 | 65 | 20 | 40 | 40 | 20 |
| | Mica | | | 20 | 10 | | | | | 20 | 30 | | | | | 20 | | |
| | Glass fiber | | 20 | 20 | 20 | | 10 | | | | 30 | 40 | | | 20 | | | 20 |

TABLE 2

| | | | Examples | | | | | | | | | |
|---|---|---|---|---|---|---|---|---|---|---|---|---|
| | | | 1 | 2 | 3 | 4 | 5 | 6 | 7 | 8 | 9 | 10 |
| Evaluation Results of physical properties of material (%) | Specific gravity | | 1.53 | 1.53 | 1.54 | 1.53 | 1.46 | 1.35 | 1.66 | 1.52 | 1.53 | 1.75 |
| | Flexural modulus (Mpa) | 23° C. | 8860 | 8850 | 9350 | 9010 | 7190 | 5900 | 10100 | 8490 | 8760 | 14100 |
| | | 80° C. | 8360 | 8310 | 8860 | 8520 | 6700 | 5310 | 9090 | 8010 | 8210 | 13000 |
| | Izod impact strength (J/m) | | 34 | 47 | 37 | 40 | 34 | 45 | 37 | 45 | 30 | 35 |
| | Heat deflection temperature (° C.) | | 191 | 220 | 213 | 215 | 180 | 175 | >220 | 184 | 189 | >220 |
| | Mold shrinkage percentage (%) | Flow direction | 0.16 | 0.13 | 0.17 | 0.15 | 0.20 | 0.23 | 0.13 | 0.17 | 0.16 | 0.09 |
| | | Perpendicular direction | 0.22 | 0.32 | 0.38 | 0.34 | 0.27 | 0.47 | 0.18 | 0.24 | 0.23 | 0.17 |
| | Anisotropy of mold shrinkage percentage (perpendicular/flow) | | 1.38 | 2.46 | 2.24 | 2.27 | 1.35 | 2.04 | 1.38 | 1.41 | 1.43 | 1.89 |
| | Linear expansion coefficient (×10$^{-5}$ mm/mm/° C.) | Flow direction | 2.4 | 2.1 | 2.1 | 2.1 | 2.8 | 3.2 | 2.0 | 2.5 | 2.4 | 1.83 |
| | | Perpendicular direction | 3.2 | 4.1 | 4.2 | 4.1 | 3.8 | 5.4 | 2.7 | 3.3 | 3.2 | 3.11 |
| | Anisotropy of linear expansion coefficient (perpendicular/flow) | | 1.33 | 1.95 | 2.00 | 1.95 | 1.35 | 1.69 | 1.35 | 1.32 | 1.33 | 1.69 |
| | Flame retardancy | | V-1 | V-1 | V-1 | V-1 | V-1 | V-1 | V-1 | V-1 | V-1 | V-1 |
| Evaluation results of dimensional precision of tray molded article for optical disk drives | Warping of molded article (with eye) | 1) After molding | A | A | A–B | A | A | A–B | A | A | A | A |
| | | 2) After heating | A | A | A–B | A | A | A–B | A | A | A | A |
| | Amount of warping (mm) | Measured Portion A 1) After molding | 0.14 | 0.18 | 0.20 | 0.19 | 0.16 | 0.21 | 0.12 | 0.15 | 0.14 | 0.11 |
| | | Measured Portion B 1) After molding | 0.12 | 0.17 | 0.20 | 0.18 | 0.13 | 0.20 | 0.11 | 0.13 | 0.14 | 0.12 |
| | | Measured Portion C 1) After molding | 0.13 | 0.18 | 0.19 | 0.19 | 0.14 | 0.19 | 0.12 | 0.13 | 0.15 | 0.10 |
| | | Measured Portion D 1) After molding | 0.16 | 0.18 | 0.19 | 0.18 | 0.19 | 0.22 | 0.14 | 0.17 | 0.17 | 0.11 |
| | | Measured Portion E*) 1) After molding | 4.1 | 4.4 | 4.5 | 4.4 | 4.1 | 4.6 | 4.1 | 4.2 | 4.2 | 4.0 |
| | | Measured Portion F*) 1) After molding | 6.4 | 6.6 | 6.7 | 6.7 | 6.5 | 6.7 | 6.3 | 6.4 | 6.4 | 6.2 |

| | | | Comparative Examples | | | | | | | |
|---|---|---|---|---|---|---|---|---|---|---|
| | | | 1 | 2 | 3 | 4 | 5 | 6 | 7 | 8 |
| Evaluation Results of physical properties of material (%) | Specific gravity | | 1.53 | 1.23 | — | 1.60 | — | 1.53 | 1.53 | 1.62 |
| | Flexural modulus (Mpa) | 23° C. | 10590 | 3100 | — | 9250 | — | 7800 | 6050 | 11770 |
| | | 80° C. | 9230 | 2140 | — | 8170 | — | 7430 | 5610 | 9420 |
| | Izod impact strength (J/m) | | 39 | 34 | — | 34 | — | 21 | 22 | 39 |
| | Heat deflection temperature (° C.) | | >220 | 130 | — | >220 | — | 180 | 160 | >220 |
| | Mold shrinkage percentage (%) | Flow direction | 0.13 | 0.50 | — | 0.14 | — | 0.16 | 0.12 | 0.08 |
| | | Perpendicular direction | 0.43 | 0.70 | — | 0.38 | — | 0.23 | 0.33 | 0.33 |
| | Anisotropy of mold shrinkage percentage (perpendicular/flow) | | 3.31 | 1.40 | — | 2.71 | — | 1.43 | 2.75 | 4.13 |
| | Linear expansion coefficient (×10$^{-5}$ mm/mm/° C.) | Flow direction | 1.4 | — | — | 2.2 | — | 2.4 | 2.2 | 1.4 |
| | | Perpendicular direction | 4.5 | | | 4.9 | | 3.4 | 4.3 | 4.2 |
| | Anisotropy of linear expansion coefficient (perpendicular/flow) | | 3.21 | — | — | 2.23 | — | 1.42 | 1.95 | 3.00 |
| | Flame retardancy | | V-1 | V-1 | — | V-1 | — | V-1 | V-1 | V-1 |
| Evaluation results of dimensional precision of tray molded article for optical disk drives | Warping of molded article (with eye) | 1) After molding | B–C | B–C | — | C | — | B | B | C |
| | | 2) After heating | B–C | B–C | — | C | — | B | B | C |
| | Amount of warping (mm) | Measured Portion A 1) After molding | 0.65 | — | — | 1.1 | — | 0.47 | 0.53 | 3.3 |
| | | Measured Portion B 1) After molding | 0.62 | — | — | 1.0 | — | 0.45 | 0.48 | 2.9 |
| | | Measured Portion C 1) After molding | 0.64 | — | — | 1.3 | — | 0.45 | 0.51 | 3.1 |
| | | Measured Portion D 1) After molding | 0.61 | — | — | 1.3 | — | 0.38 | 0.419 | 3.4 |

TABLE 2-continued

|  |  |  |  |  |  |  |  |
|---|---|---|---|---|---|---|---|
| Measured Portion E*) 1) After molding | 5.1 | — | — | 5.3 | — | 5.0 | 5.1 | 5.8 |
| Measured Portion F*) 1) After molding | 7.4 | — | — | 7.6 | — | 7.0 | 7.1 | 8.0 |

*)Set value: measurement Portion E = 4.1, Measurement Portion F = 6.1

Examples 11 to 18 and Comparative Examples 9 to 12

Respective components shown in Table 3 were melt-kneaded in a twin-screw extruder (ZSK-40, manufactured by WERNER & PFLEIDERE) set at a temperature of 290 to 320° C. and a screw rotation number of 500 rpm to obtain a composition pellet.

Using this pellet, a dumbbell for evaluation of physical properties of material and an optical pickup base were injection molded at each cylinder temperature and mold temperature and then subjected to various tests by the methods described above. The evaluation results are shown in Table 4.

In Examples 11 to 18, the molded article exhibited excellent moldability with less warping and small amount of flash.

In Comparative Example 9 where an inorganic filler in a flake form was not added, the molded article was largely warped and in Comparative Example 10 where the blended amount of an inorganic filler in a flake form was small, the rigidity was insufficient and the heat deflection temperature, namely, heat resistance was low, therefore, the optical pickup base produced was deformed due to the effect of heat generated within the optical pickup device.

In Comparative Example 11 where the blended amount of an inorganic filler in a flake form was increased and in Comparative Example 12 where the amount of a polyphenylene ether blended was increased, the flowability of resin was extremely bad and a good molded article could not be obtained.

Comparative Examples 13 and 14

Using a polyphenylene sulfide resin (Idemitsu PPS C-1040SG, produced by Idemitsu Petrochemical Co., Ltd., blended material with 40% of glass fiber), an optical pickup base was prepared in the same manner as in Example 11 under the molding conditions shown in Table 3 and subjected to various tests by the methods described above. The evaluation results are shown in Table 4.

In both of Comparative Examples 13 and 14 where the same material was used and the molding conditions were changed, the optical pickup base was not practical because warping and flash were large and reduction in the weight was not satisfactory.

TABLE 3

|  |  | Blended Composition (wt %) |  |  |  |  |  |  | Molding Condition |  |
|---|---|---|---|---|---|---|---|---|---|---|
|  |  | PPS | PPE | Compatibilizing Agent | Hydrogenated Styrene-Butadiene Block Copolymer | Glass Flake | Mica | Glass Fiber | Cylinder Temperature, ° C. | Mold Temperature, ° C. |
| Example | 11 | 35 | 23 | 2 |  | 40 |  |  | 290–310 | 90 |
|  | 12 | 35 | 23 | 2 |  | 20 |  | 20 | 290–310 | 90 |
|  | 13 | 35 | 23 | 2 |  |  | 20 | 20 | 290–310 | 90 |
|  | 14 | 35 | 22 | 3 |  | 10 | 10 | 20 | 290–310 | 90 |
|  | 15 | 49 | 17 | 4 |  | 30 |  |  | 290–310 | 90 |
|  | 16 | 44 | 31 | 5 |  | 10 |  | 10 | 290–310 | 90 |
|  | 17 | 35 | 12 | 3 |  | 50 |  |  | 290–310 | 90 |
|  | 18 | 35 | 19 | 2 | 4 | 40 |  |  | 290–310 | 90 |
| Comparative Example | 9 | 35 | 23 | 2 |  |  |  | 40 | 290–310 | 90 |
|  | 10 | 63 | 28 | 5 |  | 4 |  |  | 290–310 | 90 |
|  | 11 | 21 | 12 | 2 |  | 65 |  |  | 290–310 | 90 |
|  | 12 | 12 | 46 | 2 |  | 40 |  |  | 290–310 | 90 |
|  | 13 | Idemitsu PPS C-1040SG (PPS, produced by Idemitsu Petrochemical Co., Ltd.) |  |  |  |  |  |  | 300–330 | 90 |
|  | 14 | (blended with 40 wt % of glass fiber) |  |  |  |  |  |  |  | 140 |

TABLE 4

|  | Evaluation of Physical Properties of Material |  |  |  |  | Molding Evaluation of Optical Pickup Base |  |
|---|---|---|---|---|---|---|---|
|  |  | Heat Resistance (° C.) | Linear Expansion Coefficient (×10$^{-5}$ mm/mm/° C.) |  |  | Warping of |  |
|  | Specific Gravity | Heat deflection Temperature | Flow Direction | Perpendicular Direction | Anisotropy | Molded Article (μm) | Flash of Molded Article (μm) |
| Example 11 | 1.53 | 191 | 2.4 | 3.2 | 1.33 | 5 | 8.3 |
| Example 12 | 1.53 | 220 | 2.1 | 4.1 | 1.95 | 27 | 7.9 |

TABLE 4-continued

| | | Evaluation of Physical Properties of Material | | | | Molding Evaluation of Optical Pickup Base | |
|---|---|---|---|---|---|---|---|
| | | Heat Resistance (° C.) | Linear Expansion Coefficient (×10⁻⁵ mm/mm/° C.) | | | Warping of | |
| | Specific Gravity | Heat deflection Temperature | Flow Direction | Perpendicular Direction | Anisotropy | Molded Article (μm) | Flash of Molded Article (μm) |
| Example 13 | 1.54 | 213 | 2.1 | 4.2 | 2.00 | 19 | 7.9 |
| Example 14 | 1.53 | 215 | 2.1 | 4.1 | 1.95 | 22 | 8.1 |
| Example 15 | 1.46 | 180 | 2.8 | 3.8 | 1.35 | 6 | 8.8 |
| Example 16 | 1.35 | 175 | 3.2 | 5.4 | 1.69 | 25 | 9.1 |
| Example 17 | 1.66> | 220 | 2.0 | 2.7 | 1.35 | 3 | 7.5 |
| Example 18 | 1.52 | 184 | 2.5 | 3.3 | 1.32 | 6 | 9.0 |
| Comparative Example 9 | 1.53> | 220 | 1.4 | 4.5 | 3.21 | 112 | 8.3 |
| Comparative Example 10 | 1.23 | 130 | 5.1 | 5.7 | 1.12 | 180 | 40.0 |
| Comparative Example 11 | — | — | — | — | — | — | — |
| Comparative Example 12 | — | — | — | — | — | — | — |
| Comparative Example 13 | 1.62> | 220 | 1.4 | 4.2 | 3.00 | 230 | 45.0 |
| Comparative Example 14 | 1.62> | 220 | 1.5 | 4.2 | 2.80 | 250 | 82.0 |

Examples 19 and 20

Respective components shown in Table 5 were melt-kneaded in a twin-screw extruder (ZSK-40, manufactured by WERNER & PFLEIDERE) set at a temperature of 290 to 320° C. and a screw rotation number of 500 rpm to obtain a composition pellet. A fatty acid metal salt (magnesium stearate) was dry blended to the obtained resin pellet and the pellet was injection-molded (resin temperature: 310° C., mold temperature: 140° C.) to evaluate the mold releasability and the presence or absence of surface stripping of resin. The evaluation results are shown in Table 5. The mold releasability was good.

Comparative Examples 15

The releasability when the additive was not blended with the polyphenylene sulfide resin composition is shown in Table 5. The mold releasability was not satisfied.

TABLE 5

| | | Example 19 | Example 20 | Comparative Example 15 |
|---|---|---|---|---|
| Resin composition (wt %) | Polyphenylene sulfide resin | 35.0 | 35.0 | 60.0 |
| | Polyphenylene ether resin | 22.47 | 21.9 | |
| | Compatibilizing agent | 2.0 | 2.0 | |
| | Glass fiber | | 20.0 | 40.0 |
| | Glass flake | 40.0 | 20.0 | |
| Amount of additive blended (wt %) | Ethylene-propylene blended (wt %) | 0.5 | 1.0 | |
| | Magnesium stearate | 0.03 | 0.1 | |
| Mold-releasing force (N) | | 1340 | 1260 | 2290 |
| Presence or absence of surface stripping of resin | | absent | absent | absent |

The resin-made mechanical element for optical disk drives of the present invention is excellent in all of heat resistance, mechanical strength, rigidity, dimensional precision, flame retardancy, moldability, mold releasability and lightweightness and therefore, enables not only the improvement of performance of elements which have been conventionally produced from modified PPE resin, polycarbonate resin, PPS resin or the like, but also resinification of elements which have been difficult of resinification from metal in view of required performance. Thus, the resin-made mechanical element for optical disk drives of the present invention greatly contributes to the lightweighting of product, broadening in the latitude of shape, reduction in the cost, and the like.

While the invention has been described in detail and with reference to specific embodiments thereof, it will be apparent to one skilled in the art that various changes and modifications can be made therein without departing from the spirit and scope thereof.

What is claimed is:

1. An optical disk drive chassis or optical disk drive tray comprising a filler reinforced resin composition obtained by blending from 5 to 150 parts by weight of an inorganic filler in a flake form to 100 parts by weight of a resin composition comprising from 30 to 90% by weight of a polyphenylene sulfide resin, from 70 to 10% by weight of a polyphenylene ether resin, and a compatibilizing agent, wherein a combination of an amorphous α-olefin copolymer selected from the group consisting of an ethylene-propylene copolymer and an ethylene-butene copolymer and a fatty acid metal salt is further blended in a total amount of 0.2 to 3.0 parts by weight with 100 parts by weight of the filler reinforced resin composition.

2. The optical disk drive chassis or optical disk drive tray as claimed in claim 1, wherein the inorganic filler in a flake form is glass flake.

3. The optical disk drive chassis or optical disk drive tray as claimed in claim 1, wherein the amorphous α-olefin copolymer is an ethylene-propylene copolymer and the fatty acid metal salt is magnesium stearate.

4. The optical disk drive chassis or optical disk drive tray of claim 1, which is an optical disk drive chassis.

5. The optical disk drive chassis or optical disk drive tray of claim 1, which is an optical disk drive tray.

6. The optical disk drive chassis or optical disk drive tray as claimed in claim 1, wherein the amorphous α-olefin copolymer is an ethylene-propylene copolymer.

7. An optical disk drive chassis or optical disk drive tray comprising a filler reinforced resin composition obtained by blending a combination of an inorganic filler in a flake form and a fibrous reinforcing filler in a total amount of 5 to 150 parts by weight with 100 parts by weight of a resin composition comprising from 30 to 90% by weight of a polyphenylene sulfide resin, from 70 to 10% by weight of a polyphenylene ether resin, and a compatibilizing agent, wherein a combination of an amorphous α-olefin copolymer selected from the group consisting of an ethylene-propylene copolymer and an ethylene-butene copolymer and a fatty acid metal salt is further blended in a total amount of 0.2 to 3.0 parts by weight with 100 parts by weight of the filler reinforced resin composition.

8. The optical disk drive chassis or optical disk drive tray as claimed in claim 7, wherein the inorganic filler in a flake form is glass flake.

9. The optical disk drive chassis or optical disk drive tray as claimed in claim 7, wherein the inorganic filler in a flake form is mica.

10. The optical disk drive chassis or optical disk drive tray as claimed in claim 7, wherein the inorganic filler in a flake form comprises glass flake and mica.

11. The optical disk drive chassis or optical disk drive tray as claimed in claim 7, wherein the fibrous reinforcing filler is glass fiber.

12. The optical disk drive chassis or optical disk drive tray of claim 7, which is an optical disk drive chassis.

13. The optical disk drive chassis or optical disk drive tray of claim 7, which is an optical disk drive tray.

14. The optical disk drive chassis or optical disk drive tray as claimed in claim 7, wherein the amorphous α-olefin copolymer is an ethylene-propylene copolymer and the fatty acid metal salt is magnesium stearate.

15. The optical disk drive chassis or optical disk drive tray as claimed in claim 7, wherein the amorphous α-olefin copolymer is an ethylene-propylene copolymer.

16. A pick up base for optical disk drives, comprising: a filler reinforced resin composition having a linear expansion coefficient anisotropy of from 1.0 to 2.5 obtained by blending from 5 to 150 parts by weight of an inorganic filler in a flake form to 100 parts by weight of a resin composition comprising from 30 to 90% by weight of a polyphenylene sulfide resin, from 70 to 10% by weight of a polyphenylene ether resin, and a compatibilizing agent, wherein a combination of an amorphous α-olefin copolymer selected from the group consisting of an ethylene-propylene copolymer and an ethylene-butene copolymer and a fatty acid metal salt is further blended in a total amount of 0.2 to 3.0 parts by weight with 100 parts by weight of the filler reinforced resin composition.

17. The pick up base for optical disk drives as claimed in claim 16, wherein the inorganic filler in a flake form is glass flake.

18. The pick up base for optical disk drives as claimed in claim 16, wherein the amorphous α-olefin copolymer is an ethylene-propylene copolymer and the fatty acid metal salt is magnesium stearate.

19. The pick up base for optical disk drives as claimed in claim 16, wherein the amorphous α-olefin copolymer is an ethylene-propylene copolymer.

20. A pick up base for optical disk drives, comprising: a filler reinforced resin composition having a linear expansion coefficient anisotropy of from 1.0 to 2.5 obtained by blending a combination of an inorganic filler in a flake form and a fibrous reinforcing filler in a total amount of 5 to 150 parts by weight with 100 parts by weight of a resin composition comprising from 30 to 90% by weight of a polyphenylene sulfide resin, from 70 to 10% by weight of polyphenylene ether resin, and a compatibilizing agent, wherein a combination of an amorphous α-olefin copolymer selected from the group consisting of an ethylene-propylene copolymer and an ethylene-butene copolymer and a fatty acid metal salt is further blended in a total amount of 0.2 to 3.0 parts by weight with 100 parts by weight of the filler reinforced resin composition.

21. The pick up base for optical disk drives as claimed in claim 20, wherein the inorganic filler in a flake form is glass flake.

22. The pick up base for optical disk drives as claimed in claim 20, wherein the inorganic filler in a flake form is mica.

23. The pick up base for optical disk drives as claimed in claim 20, wherein the inorganic filler in a flake form is glass flake and mica.

24. The pick up base for optical disk drives as claimed in claim 20, wherein the fibrous reinforcing filler is glass fiber.

25. The pick up base for optical disk drives as claimed in claim 20, wherein the amorphous α-olefin copolymer is an ethylene-propylene copolymer and the fatty acid metal salt is magnesium stearate.

26. The pick up base for optical disk drives as claimed in claim 20, wherein the amorphous α-olefin copolymer is an ethylene-propylene copolymer.

* * * * *